United States Patent [19]

Myrskog et al.

[11] Patent Number: 5,457,814
[45] Date of Patent: Oct. 10, 1995

[54] POWER BOOST SYSTEM FOR CELLULAR TELEPHONE

[75] Inventors: Markku Myrskog, Oulu; Jari Muurinen, Pernio; Markku Oksanen; Eero Jousinen, both of Salo, all of Finland

[73] Assignee: Nokia Mobile Phones Ltd., Salo, Finland

[21] Appl. No.: 292,355

[22] Filed: Aug. 18, 1994

Related U.S. Application Data

[63] Continuation of Ser. No. 956,060, Oct. 2, 1993, abandoned.

[51] Int. Cl.$^6$ .................................................. H04B 1/04
[52] U.S. Cl. .............................................. 455/127; 455/89
[58] Field of Search ........................... 455/127, 89, 68, 455/115, 90, 83, 38.3, 126

[56] References Cited

U.S. PATENT DOCUMENTS

| | | | |
|---|---|---|---|
| 4,636,741 | 1/1987 | Mitzlaff | 330/127 |
| 4,654,882 | 3/1987 | Ikeda . | |
| 4,835,499 | 5/1989 | Pickett . | |
| 5,033,109 | 7/1991 | Kawano et al. . | |
| 5,033,111 | 7/1991 | Marui | 455/127 |
| 5,101,507 | 3/1992 | Jung | 455/127 |
| 5,129,098 | 7/1992 | McGirr et al. | 455/69 |
| 5,193,219 | 3/1993 | Tamura | 455/89 |
| 5,287,557 | 2/1994 | Korycan | 455/89 |
| 5,291,147 | 3/1994 | Muurinen | 455/126 |

FOREIGN PATENT DOCUMENTS

| | | |
|---|---|---|
| 0359477 | 3/1990 | European Pat. Off. . |
| 0392132 | 10/1990 | European Pat. Off. . |
| 0413355 | 2/1991 | European Pat. Off. . |
| 0534681A2 | 3/1993 | European Pat. Off. . |
| 1015477 | 12/1965 | United Kingdom . |
| 2241124 | 2/1991 | United Kingdom . |

Primary Examiner—Edward F. Urban
Assistant Examiner—Mary M. Lin
Attorney, Agent, or Firm—Perman & Green

[57] ABSTRACT

A power boost system for a portable radiotelephone (10) employs a booster unit (52) to provide sufficient power for operation of the radiotelephone as a mobile unit in a cellular telephone system, and a junction box (54) which, in combination with a mechanical holder (56) allows for hands-free operation of the radiotelephone in the mobile telephone environment. The junction box is provided with a speaker (62) and a microphone (64) to facilitate the hands-free operation. The desired output power level for radiation from a vehicular antenna (72) is provided by a gain-controlled amplifier (80) in response to a pulse-width modulated command signal (48, 90) provided by a computer (12) within the radiotelephone. A memory (70) within the booster unit stores power level data for the higher levels of power to be used during transmission by the booster unit, the power level data being provided to the computer (12) in generating the power command signal. The memory (70) also stores calibration data of the booster unit attained during manufacture of the booster unit, this data being provided to the computer (12) to compensate for measured values of received signal strength for accurate search of the strongest signal.

12 Claims, 2 Drawing Sheets

POWER BOOST SYSTEM FOR CELLULAR TELEPHONE

This is a continuation of application Ser. No. 07/956,060 filed on Oct. 2, 1992, now abandoned.

BACKGROUND OF THE INVENTION

This invention relates to portable cellular radiotelephones adaptable for use in vehicular communications and, more particularly, to a power boost system for a portable radiotelephone wherein a power booster is automatically controlled by the radiotelephone.

Portable radiotelephones are readily carried about by a person so as to enable two-way conversation via a cellular telephone system from any of numerous locations, including a home, office, or outdoors. The radio telephone has a rechargeable battery to provide operating electric power, and transmits at a relatively low power level which is adequate in urban areas because transmission distances to a central cellular transmission/reception antenna are relatively short. At times, it may be desirable to operate the radiotelephone as a mobile telephone in a vehicle which is driven in rural areas, this necessitating transmission over a substantially larger distance from the radiotelephone to the base station antenna. In view of the increased distance, greater transmitted power from the radiotelephone is required, and a larger, more efficient antenna such as that carried by an automobile is preferred for both transmission and reception to insure high quality telephone communication.

One way of providing the higher transmitted power capability is to equip the radiotelephone with an outside higher-voltage source. However, this leads to increased weight, bulk and cost, and greatly diminishes the amplifier reliability of the radiotelephone. Also, excessive radiated power from a portable radio-telephone may present a health hazard. Thus, there is a need for providing a portable cellular radiotelephone with a means for adaptation to the mobile telephony situation wherein greater transmitted power is required, and wherein such adaptation can be accomplished automatically without assistance from the person using the telephone equipment. A problem exists in that presently available telephone equipment cannot fulfill this need in an economically feasible fashion with consideration to both architecture and implementation.

SUMMARY OF THE INVENTION

The aforementioned problem is overcome and other advantages are provided by a booster system which, in accordance with the invention, increases the transmitted power of the radiotelephone upon use of the radiotelephone for mobile service in a vehicle. The booster system comprises a booster unit having the requisite power transmission circuitry and receiver circuitry, a junction box providing an interface between the portable radiotelephone and the booster unit, and a holder for the radiotelephone. The junction box includes an external microphone and speaker amplifier for hands-free operation, and also has a charger for charging a battery in the radiotelephone.

In order to accommodate varying demands for transmission power, the booster unit is provided with a memory, preset at the time of manufacture, with stored data as to requisite power. Since the presence of the booster and its antenna alters the received signal strength at the radiotelephone, the memory of the booster also stores correction factors to be applied to received signal strength information (RSSI) to compensate for changes in the signal strength. A microprocessor in the radiotelephone handles the digital control processing requirements of telephonic communication, and addresses the memory in the booster unit to implement required power and RSSI sensitivity levels. Command signals from the radiotelephone are multiplexed to reduce the number of physical connections to the booster unit. A power control signal is supplied, via a single conductor with pulse-width modulation, to the booster unit. The presence of outputted data from the booster unit memory serves as an indication to the microprocessor of the radiotelephone that the booster unit is present and is operating. Included within the booster unit is a duplex filter with an adjustable frequency pass band to manage any spurious response, and a fault detection indication based on a sensing of RF (radio frequency) power levels.

BRIEF DESCRIPTION OF THE DRAWING

The aforementioned aspects and other features of the invention are explained in the following description, taken in connection with the accompanying drawing wherein.

DETAILED DESCRIPTION

Figure 1:
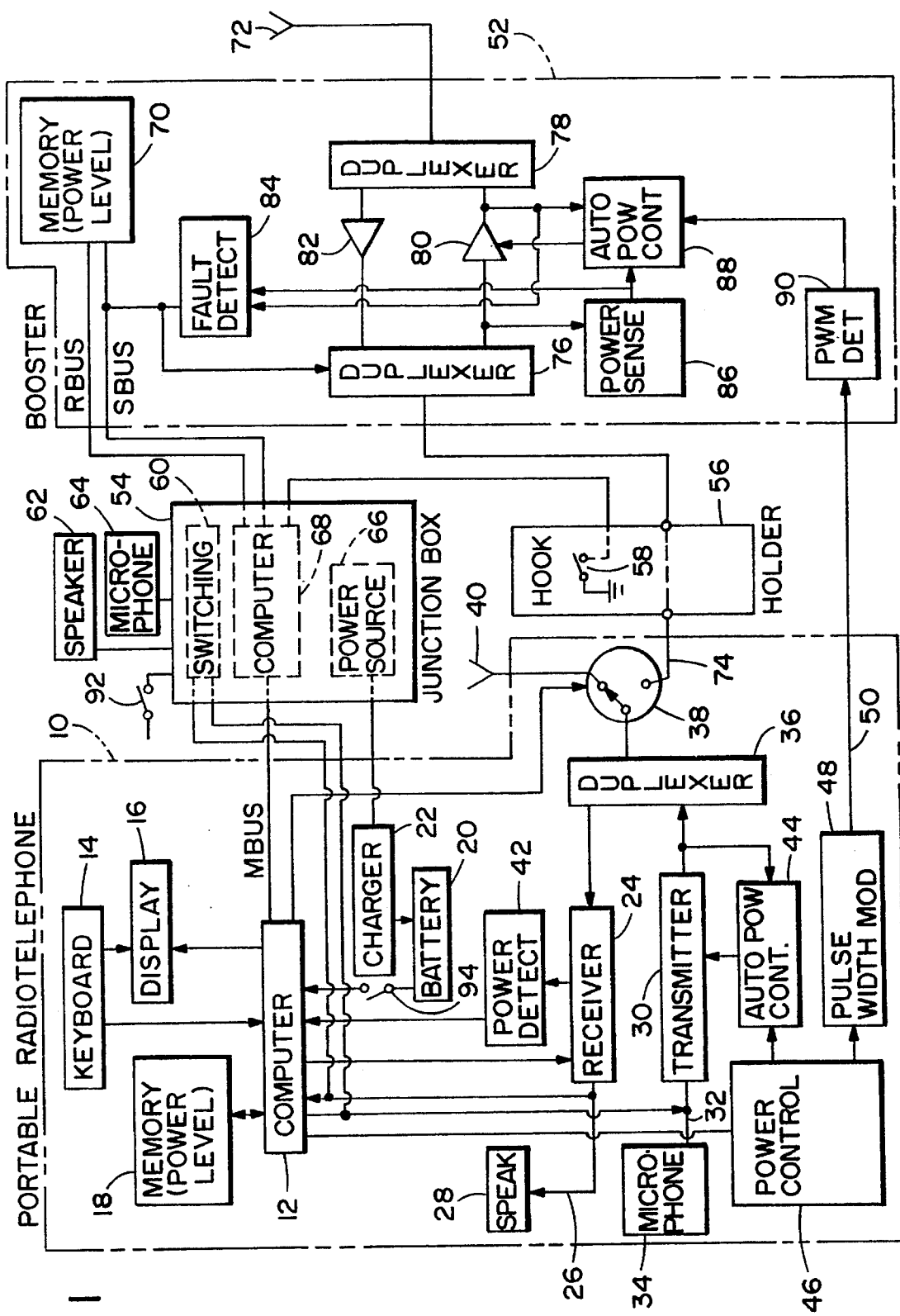
FIG. 1 is a block diagram of a portable radiotelephone with connection to a booster, in accordance with the invention.

In FIG. 1, a radiotelephone 10 is constructed as a portable unit which may be carried readily by hand. The radiotelephone 10 comprises a computer 12, preferably in the form of a microprocessor, and includes a keyboard 14, a display 16, and a memory 18 which connect to the computer 12. Electric power for operation of the computer 12 and other components of the radiotelephone 10 are provided by a battery 20 included within the radiotelephone 10. A battery charger 22 includes circuitry for charging the battery 20. Also included in the radiotelephone 10 are a receiver 24 outputting an audio signal via line 26 to a speaker 28 and a transmitter 30 which receives an audio signal via line 32 from a microphone 34. The radio signal on line 32 is modulated on a carrier by the transmitter 30 in conventional fashion, and then is coupled via a duplexer 36 and a switch 38 for transmission via an antenna 40 of the radiotelephone 10. Signals received at the radiotelephone 10 by the antenna 40, are coupled via the switch 38 and the duplexer 36 to the receiver 24, the receiver 24 operating in conventional fashion to demodulate a carrier-modulated signal to provide the voice signal on line 26. The power of an RF (radio frequency) signal received at the receiver 24 is detected by a RSSI detector 42. Outgoing RF power of the transmitter 30 is monitored by an automatic-power control (APC) circuit 44. The APC circuit 44 establishes a desired level of power gain in the transmitter 30 in response to a command signal provided by a power control unit 46. The power control unit 46 operates in response to instructions from the computer 12. The power command of the control unit 46 is converted also to a pulse-width modulated signal via a modulator 48 to be outputted from the radiotelephone 10 as a command signal on line 50, as will be described hereinafter.

In operation, the radiotelephone 10 provides for incoming and outgoing telephonic communication wherein a voice spoken by a person utilizing the radiotelephone 10 is incident upon the microphone 34 to be transmitted via a transmitter 30 to a distant location, such as the antenna of a cellular telephone system wherein the antenna is located at a base station within a cell of the telephone system. Similarly, the receiver 24 is operative to receive the incoming portion of the telephonic communication from the cellular communication system to activate the speaker 28 to enable the person to hear an incoming voice message. The telephone number of a party to be called is entered into the computer 12 via the keyboard 14, the number being displayed by the display 16. Other messages or status information which may be generated by the computer 12 are also presented upon the display 16. The memory 18 stores data as to various levels of power to be applied to outgoing signals via the transmitter 30 such that the power of a signal radiated from the antenna 40 is in accord with the protocol of the cellular telephone system. Such power may be adjusted in accordance with distance of the radiotelephone 10 from the system antenna of the system cell wherein the radiotelephone 10 is located. Instructions to increase or decrease transmitted power to a specific level, transmitted from the system cell-site antenna, are received by the receiver 24 and applied to the computer 12. In response, the computer 12 reads the contents of the memory 18 to obtain the next power level, and transmits the next power level to the power control unit 46. The (APC) circuit 44 compares an output signal of the transmitter 30 with the power command signal of the control unit 46 to output a gain-control signal to the transmitter 30 for adjusting its gain to provide the desired level of output power.

In accordance with the invention, the radiotelephone 10 can be employed also with a booster 52 for adapting the radiotelephone 10 for use in mobile communications, such as on board a motor vehicle. In such a situation, the radiotelephone 10 may be transported from an urban area near to the cellular system cell-site central antenna to a rural region distant from the cell-site central antenna. The increased distances of the radiotelephone 10 from the cell-site central antenna necessitate the provision of additional power to a signal transmitted by the transmitter 30, the additional power being provided by the booster 52. Connection to the booster 52 is provided by a junction box 54 which, in accordance with a feature of the invention, is operated in a hands-free operation with the aid of a mechanical holder 56 which provides physical support to the radiotelephone 10 within the motor vehicle, and includes a hook switch 58 which signals a removal of the radiotelephone 10 from the holder 56.

The junction box 54 includes switching circuitry 60 for connection of a speaker 62 and a microphone 64 to the receiver 24 and the transmitter 30, respectively, during hands-free operation of the radiotelephone 10. The speaker 62 and the microphone 64 may be mounted conveniently upon the junction box 54. A power source 66 within the junction box 54 applies suitable electric current and voltage to the charger 22 for charging the battery 20 upon electrical connection of the radiotelephone 10 of the junction box 54. Also included in the junction box 54 is a computer 68, constructed preferably as a microprocessor, and being coupled to the computer 12 via a multiplexed serial bidirectional data bus identified in the figures as MBUS. The MBUS, along with the electrical lines to the switching circuit 60 and to the power source 66 are arranged within an electrical cable. The electrical cable is readily connected to the junction box 54 for operation of the radiotelephone 10 in the motor vehicle, and disconnected when it is desired to remove the radio telephone 10 from the motor vehicle and to be carried about in a person's hand. In the preferred embodiment of the invention, all signals from the portable unit go through a connector (not shown) in the portable unit to a connector of the holder which is then further wired to the junction box with an electrical cable. The signals included are, for example, MBUS signals, audio, charger voltage, and PWM power control signals. An RF cable (line 74) from the holder is not connected to the junction box by is connected directly to the booster. In this respect, it is noted that FIG. 1 shows only logical connections between units.

The booster 52 includes a memory 70 (such as an EEPROM) for storing power level data, similar to that of the memory 18 in the radiotelephone 10, the memory 70 providing for additional higher values of power level as are required for operation in the mobile environment. The memory 70 is connected to the computer 68 by two busses identified as the RBUS and the SBUS which carry clock and data from the computer 68 to the booster memory 70. The booster 52 is provided with a vehicular mounted antenna 72 which is substantially larger than the antenna 40 mounted on the radiotelephone 10 to facilitate radiation of a larger amount of power, and to facilitate reception of weaker signals present in rural areas at increased distances from the cell-site antenna of the cellular telephone system. Also stored within the memory 70 is data relating to correction factors useful for reception of telephone signals by the radiotelephone 10 via the booster antenna 72 and circuitry within the booster 52. The transmission of a received signal via the booster 52 introduces a change in the signal amplitude which would offset the calibration of the power detector 42 of the radiotelephone 10. Accordingly, the correction factors stored in the memory 70 are employed by the computer 12 of the radiotelephone 10 to correct the measurement of received signal power, namely, the received signal strength information (RSSI), to compensate for the effect of the booster 52.

In accordance with a feature of the invention, the computer 68 of the junction box 54 reads the power level data and the RSSI correction factors in the memory 70, and communicates this information via a serial bus, the MBUS, to the computer 12. The capacity to read this data is taken as an indication that the booster 52 is operating and is properly connected to the junction box 54. The computer 12, upon receipt of this information, acknowledges that there is a proper connection of the radiotelephone 10 to the booster 52 via the junction box 54, and responds by activating the switch 38 to switch connection of the duplexer 36 from the antenna 40 to a line 74. The line 74 extends through the holder 56 to the booster 52 for radiation and transmission of telephony signals via the booster 52 and its antenna 72. The line 74 is broken at the holder 56 by a connector (not shown) upon removal of the radiotelephone 10 from the vehicle carrying the booster 52.

Also included within the booster 52 are two duplexers 76 and 78, a transmission amplifier 80 and a reception amplifier 82, a fault detector 84, a power sensor 86, an automatic power control (APC) circuit 88, and a detector 90 of pulse-width modulated signals on line 50. The line 50 is also connected via a connector in the holder 56 (not shown) to the booster 52 which allows for connection and disconnection of the radiotelephone 10 from the booster 52.

In operation, outgoing signals on the line 74 are coupled via the duplexer 76 to the transmission amplifier 80 which amplifies the signals to a desired power level, and then applies the signals via the duplexer 78 for transmission from the antenna 72. Incoming signals are applied by the antenna 72 via the duplexer 78 to the reception amplifier 82. The amplifier 82 provides a relatively small gain, sufficient to overcome any losses which may be present in the circuitry components of the booster 52. Signals outputted by the amplifier 82 are coupled via the duplexer 76 to the line 74 for transmission to the radiotelephone 10. A desired output power level, as commanded by the computer 12 via the power control unit 46 and the modulator 48, is detected by the detector 90 and applied as an input command to the APC circuit 88. The output signal of the transmission amplifier 80 is also applied to the APC circuit 88 which functions to adjust the gain of the amplifier 80 to match the output power level to the commanded power level.

In accordance with a feature of the invention, the power sensor 86 detects the presence of power produced by the radiotelephone 10 and, in response to the presence of this power, activates the APC circuit 88 to operate the amplifier 80. In the absence of a sensing of radiotelephone power by the sensor 86, the power sensor 86 commands the APC circuit 88 to shut down operation of the transmission amplifier 80 thereby to insure that there is no radiation of unwanted carrier during periods of silence of the radiotelephone 10, as well as to conserve electric energy. Also, as a feature of the invention, the input power level to the transmission amplifier 80, as sensed by the sensor 86, and the output power level of the amplifier 80 are applied as input signals to the fault detector 84 which, in turn, applies a signal to the SBUS indicating proper operation or failure of the transmission channel. Logic within the fault detector 84 provides an exclusive OR function wherein the presence of power at both the input and the output terminals of the amplifier 80 is taken as an indication of correct operation, while a fault is considered to be present when there is no output power from the amplifier 80 in the presence of input power to the amplifier 80, or if output power is detected during an absence of input power to the amplifier 80.

As is noted above, the availability of power level data and RSSI data from the booster memory 70 via the MBUS to the computer 12 is taken as an indication by the computer 12 that the booster 52 is properly connected via the junction box 54 to the computer 12. The availability of this data also indicates that the booster memory 70 is functioning properly. From time to time, the computer 12 may check to ascertain the proper connection and operability of the booster 52. In the event of a disconnection of the booster 52 from the radiotelephone 10, or upon a failure to read the data stored in the memory 70, the computer 12 operates the switch 38 to switch the duplexer 36 from the line 74 back to the antenna 40. The switch 38 is operated to switch the duplexer 36 from the line 74 back to the antenna 40, also, upon the signaling of a fault by the fault detector 84. Thereby, the radiotelephone 10 is still operable for telephonic communication. The RBUS and the SBUS provide for the communication of clock signals and control signals by which the computer 68 accesses the memory 70, as well as for the communication of the data.

During the manufacture of the booster 52, it is desirable to measure its electrical characteristics so that RSSI compensation factors can be preloaded into the memory 70 during the manufacture, and thereby ensure an accurate calibration of each booster on a manufacturing assembly line. Power calibration for the booster 52 is accomplished by feeding an input RF signal corresponding approximately to the predetermined power level which is used by the portable unit when it is connected to the booster. The portable power level used with the booster is above the minimum level needed for the booster operation but not the maximum level to avoid excessive heat dissipation of the portable transmitter amplifier. The booster is calibrated with this RF input level to produce the predetermined output levels (usually 8) and find the corresponding PWM control signals (line 50). Thereafter, the corresponding PWM values are stored into the booster memory 70. The use of calibrated PWM values for each booster avoids variations of output signal level when the booster is used with different portable units having tolerances in their output power levels. RSSI calibration is accomplished by measuring gain from the booster antenna 72 to the booster RF input cable (line 74) on a few predetermined receiver frequencies, and the gain values are stored into the booster memory 70. The stored gain values are used by the portable computer 12 to correct the RSSI measurement result when the booster 52 is connected.

Also, as a further feature of the invention, if desired, the filter within the duplexer 78, as will be described in further detail, may be adjusted in terms of its passband characteristic in response to a digital signal provided by the computer 12 and coupled via the SBUS to the duplexer 78. For example, in the event that the duplexer 78 were operating over telephony channels near the low end of the spectrum, the higher-frequency end of the passband can be lowered in frequency so as to eliminate unnecessary bandwidth for improved reception of incoming signals. Though not disclosed in the circuitry herein, it is to be understood that a corresponding adjustment can be made to the lower-frequency end of the passband for removal of unnecessary bandwidth.

With respect to communication of signals from the computer 12 to components of the booster 52, it is noted that the computer 68 facilitates the transmission. The MBUS signals include digital addresses to direct the information to the desired components of the booster 52. This is a useful feature in that, even upon subsequent modifications in future manufacture of such booster, the radiotelephone 10 can still communicate with the booster 52.

With respect to the operation of the computer 68 of the junction box 54, interrupts are obtained from three sources, namely, the ignition switch 92, a power-on switch 94 of the radiotelephone 10, and a request from the computer 12 by the MBUS. The interrupts serve to activate the computer 68 from a power-down mode. Data stored in the booster memory 70 are read immediately after power on, and upon connection of the radiotelephone 10 to the holder 56, as well as upon an activation after an interval of power down.

Figure 2:
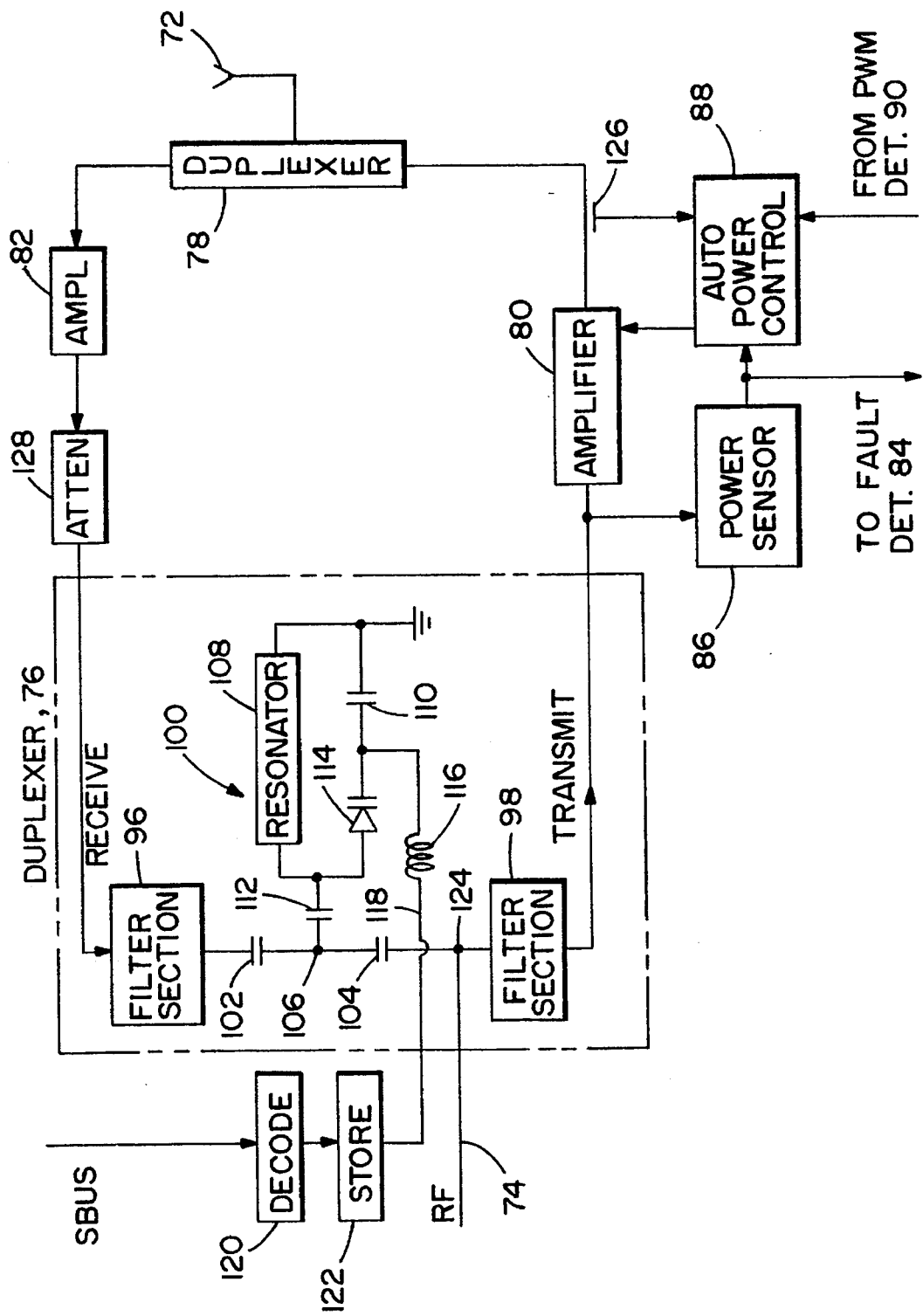
FIG. 2 is a block diagram showing details in construction of a variable filter stage of a filter assembly within a duplexer of FIG. 1.

FIG. 2 shows details in the construction of the duplexer 76 (FIG. 1) and its interconnection with the amplifiers 80 and 82 (FIG. 1). In FIG. 2, the duplexer 76 includes a plurality of filter sections of which three such sections 96, 98, and 100 are shown, by way of example. The filter sections 96, 98, and 100 are interconnected by capacitors 102 and 104, with the filter section 100 connecting to a node 106 at the junction of the capacitors 102 and 104. The filter section 100 comprises, by way of example, a resonator 108 which may be constructed in microstrip form, two capacitors 110 and 112, and a varactor 114. The varactor 114 and the capacitor 110 are connected in series, and form a circuit branch in parallel with the resonator 108. The terminal of the capacitor 110, opposite the varactor 114, connects with a terminal of the resonator 108 and is grounded. The opposite end of the resonator 108 connects with a terminal of the varactor 114, opposite the capacitor 110, and connects also via the capacitor 112 to the node 106. The series connection of the capacitance of the varactor 114 with the capacitance of the capacitor 110 produces a resultant capacitance which detunes the resonant frequency of the resonator 108. The amount of detuning is a function of the magnitude of the capacitance of the varactor 114. A DC (direct current)

voltage is applied via an inductor 116 to a junction between the capacitor 110 and the varactor 114 to back-bias the varactor 114 via a DC path through the resonator 108 to ground. A shift in the DC control voltage on line 118 alters the value of the capacitance of the varactor 114, this resulting in a change in the resonant frequency of the filter section 100. The inductor 116 prevents RF signals from the filter section 100 from propagating along the line 118.

By way of example in the construction of the circuit of FIG. 2, there is shown the general situation wherein a digital data bus, herein the SBUS, provides a signal for establishing a value of the DC control voltage on line 118. A digital signal on the SBUS is decoded by a decoder 120 to produce an output value of voltage which is then stored in a storage unit 122. However, if desired, substantial simplification of the circuitry of the decoder 120 and the storage unit 122 can be accomplished by reserving use of the SBUS only for the fault detector 84 and the duplexer 76, as well as for clock pulse signals to the memory 70 only during a reading of the memory 70. For example, a logic 0 on the SBUS would indicate the presence of a fault, and a logic 1 means the absence of a fault. In such case, the computer 68 can apply a low voltage on the SBUS to indicate an alternate resonant frequency for the filter section 100. The decoder 120 would be implemented as simply a comparator to sense a value of voltage, and the storage unit 122 would be implemented simply as a resistor-capacitor integrator to store the desired value of control voltage. Such shifting of the value of the control voltage can serve to alter the passband of the duplexer 76 for reception of telephonic signals, for example, so as to attenuate telephony channels 800 to 1000 during operation with telephony channels 1 to 400 in a telephone system employing 1000 channels. This reduction in unneeded bandwidth results in an improved signal-to-noise ratio (SNR) for more reliable communication, and decreases a chance of interference from spurious intermodulation frequency components.

As shown in FIG. 2, the RF telephone signal from the radiotelephone 10, coupled via line 74, connects at a node 124 between the capacitor 104 and the filter section 98. An outputted transmit signal of the filter section 98 is applied to the amplifier 80 in the manner shown in FIG. 1, FIG. 2 showing also the power sensor 86 and the APC circuit 88 of FIG. 1. Coupling of a sample of the output signal of the amplifier 80 to the APC circuit 88 is accomplished by way of a directional coupler 126 providing for only a small fraction of the signal amplitude to be applied to the APC circuit 88. Connection of the amplifiers 80 and 82 to the duplexers 78 in FIG. 2 is the same as that disclosed in FIG. 1. An attenuator 128 (FIG. 2) is connected advantageously between the reception amplifier 82 and the duplexer 76 to facilitate adjustment of the gain of the receive branch so as to have a predetermined signal gain between the antenna 72 and the line 74. The attenuator 128 is used also to match the amplifier output impedance to the filter input impedance.

By virtue of the foregoing circuitry, the invention enables the radiotelephone to be converted easily from a portable unit to a mobile unit by connection with a booster carried within a motor vehicle.

It is to be understood that the above described embodiment of the invention is illustrative only, and that modifications thereof may occur to those skilled in the art. Accordingly, this invention is not to be regarded to the embodiment disclosed herein, but is to be limited only as defined by the appended claims.

What is claimed is:

1. A power boost system for a portable radiotelephone comprising:

a portable radiotelephone having a transceiver, and a microprocessor for implementing telephony system commands;

a booster unit connectable to said radiotelephone and having means for boosting power of a transmitted radio frequency (RF) signal outputted by said radiotelephone, said boosting means being operative to vary an amount of boost in accordance with a control signal provided by said microprocessor;

wherein said booster unit includes a booster memory storing power level data to be read by said microprocessor for selecting said amount of boost, a specific value of power level for calibration of said booster unit being stored in said booster memory; and said radiotelephone further comprises an antenna for radiating said transmitted RF signal upon disconnection of said booster unit from said radiotelephone, said radiotelephone including a second memory storing power level data, and a transmitter, said microprocessor being operative during a disconnection of said booster unit to command said transmitter to adjust a power level of said transmitted RF signal in accord with data stored in said second memory; and means responsive to a connection of said booster unit to said radiotelephone for directing said power level data and said a specific value of power level from said booster memory to said microprocessor, upon connection of said booster to said radiotelephone, to obtain a calibrated RF output power from said booster unit.

2. A system according to claim 1 wherein said radiotelephone includes means for switching said radiotelephone from said booster unit to said radiotelephone antenna for receiving said received RF signal directly from said radiotelephone antenna upon disconnection of said booster unit from said radiotelephone.

3. A system according to claim 2 further comprising a control signal line carrying said control signal from said radiotelephone to said boosting means for directing said booster unit to institute a specific level of transmission power, said control signal being a pulse-width modulated control signal.

4. A system according to claim 3 further comprising a junction box having a microprocessor therein, and data busses carrying multiplexed signals via said junction box between said microprocessor in said radiotelephone and said booster memory for accessing said booster memory.

5. A system according to claim 1 wherein said microprocessor of said junction box reads data of said booster memory to determine that said booster unit is in a state of readiness for operation with said radiotelephone.

6. A system according to claim 1 wherein said booster unit further comprises fault-detection means responsive to power outputted by said boosting means and to power outputted by said radiotelephone for signaling a failure upon a reduction of either one of said outputted powers below a power reference level.

7. A system according to claim 1 wherein said power boosting means includes an amplifier, and said booster unit further comprises means for sensing power of said RF signal outputted by said radiotelephone for adjusting a power gain of said amplifier.

8. A power boost system for a portable radiotelephone comprising:

a portable radiotelephone having a transceiver, and a microprocessor for implementing telephony system commands;

a booster unit connectable to said radiotelephone and having means for boosting power of a transmitted radio frequency (RF) signal outputted by said radiotelephone, said boosting means being operative to vary an amount of boost in accordance with a control signal provided by said microprocessor;

wherein said booster unit includes a booster memory storing power level data to be read by said microprocessor for selecting said amount of boost;

said radiotelephone further comprises an antenna for radiating said transmitted RF signal upon disconnection of said booster unit from said radiotelephone, said radiotelephone including a second memory storing power level data, and a transmitter, said microprocessor being operative during a disconnection of said booster unit to command said transmitter to adjust a power level of said transmitted RF signal in accord with data stored in said second memory;

said booster unit further comprises a receiver and an antenna for presenting a received RF signal to said radiotelephone, said radio telephone including means for measuring received signal strength to obtain received signal strength information (RSSI); and said booster memory stores correction factors to be applied to the RSSI, a specific value of power level of received signal strength for calibration of said booster unit being stored in said booster memory, said microprocessor employing said correction factors and said a specific value of power level to compensate for changes in the received signal strength resulting from the presence of said booster unit.

9. A system according to claim 8 wherein said receiver of said booster unit further comprises a duplex filter with means responsive to a command of said microprocessor to alter a bandpass characteristic of said duplex filter.

10. A system according to claim 8 wherein a specific value of transmit RF power level for calibration of said booster unit is stored in said booster memory, the system further comprising means responsive to a connection of said booster unit to said radiotelephone for directing power level data from said booster memory to said microprocessor, upon connection of said booster to said radiotelephone, to obtain a calibrated RF transmit power from said booster unit.

11. A system according to claim 10 wherein a specific value of duplex filter bandwidth for calibration of said booster unit is stored in said booster memory, and wherein said receiver of said booster unit further comprises a duplex filter with means responsive to a command of said microprocessor to alter a bandpass characteristic of said duplex filter in accordance with said stored value of duplex filter bandwidth.

12. A system according to claim 8 wherein a specific value of duplex filter bandwidth for calibration of said booster unit is stored in said booster memory, and wherein said receiver of said booster unit further comprises a duplex filter with means responsive to a command of said microprocessor to alter a bandpass characteristic of said duplex filter in accordance with said stored value of duplex filter bandwidth.

* * * * *